United States Patent
Moroga et al.

(10) Patent No.: US 11,671,216 B2
(45) Date of Patent: Jun. 6, 2023

(54) RADIO TRANSMISSION DEVICE

(71) Applicant: NTT DOCOMO, INC., Tokyo (JP)

(72) Inventors: Hideyuki Moroga, Tokyo (JP); Yuki Matsumura, Tokyo (JP); Kazuki Takeda, Tokyo (JP); Satoshi Nagata, Tokyo (JP); Yuichi Kakishima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 16/970,241

(22) PCT Filed: Feb. 16, 2018

(86) PCT No.: PCT/JP2018/005598
§ 371 (c)(1),
(2) Date: Aug. 14, 2020

(87) PCT Pub. No.: WO2019/159341
PCT Pub. Date: Aug. 22, 2019

(65) Prior Publication Data
US 2020/0412516 A1    Dec. 31, 2020

(51) Int. Cl.
*H04L 5/00* (2006.01)
*H04J 13/18* (2011.01)
(Continued)

(52) U.S. Cl.
CPC ............ *H04L 5/0012* (2013.01); *H04J 13/18* (2013.01); *H04L 5/0048* (2013.01);
(Continued)

(58) Field of Classification Search
CPC . H04L 5/02; H04L 5/10; H04L 5/0048; H04L 5/0051; H04L 27/2602;
(Continued)

(56) References Cited

U.S. PATENT DOCUMENTS 10,873,489 B2 * 12/2020 Kim .................. H04W 76/14
2016/0006550 A1 * 1/2016 Cheng ............... H04J 11/0079
370/254

(Continued)

FOREIGN PATENT DOCUMENTS

| JP | 2012-222722 A | 11/2012 | |
|---|---|---|---|
| WO | WO 2019/029329 | * 2/2019 | ............... H04L 1/00 |

OTHER PUBLICATIONS

International Search Report for corresponding International Application No. PCT/JP2018/005598, dated Apr. 24, 2018 (3 pages).
(Continued)

*Primary Examiner* — Warner Wong
(74) *Attorney, Agent, or Firm* — Osha Bergman Watanabe & Burton LLP

(57) ABSTRACT

A radio transmission device includes a transmitter (209) and a controller (203). The transmitter (209) transmits a radio signal in which a demodulation reference signal is mapped. When a plurality of the demodulation reference signals are to be mapped respectively to first and second unit resources consecutive in a time domain of the radio signal, the controller (203) applies the same sequence to each of the plurality of the demodulation reference signals to be mapped to the first and the second unit resources.

2 Claims, 5 Drawing Sheets

(51) Int. Cl.
*H04L 5/10* (2006.01)
*H04L 27/26* (2006.01)
*H04W 72/0446* (2023.01)
*H04W 72/0453* (2023.01)

(52) U.S. Cl.
CPC .............. *H04L 5/0051* (2013.01); *H04L 5/10* (2013.01); *H04L 27/2605* (2013.01); *H04L 27/2613* (2013.01); *H04L 27/26035* (2021.01); *H04L 27/26132* (2021.01); *H04W 72/0446* (2013.01); *H04W 72/0453* (2013.01); *H04L 27/261* (2013.01)

(58) Field of Classification Search
CPC ............... H04L 27/2605; H04L 27/261; H04L 27/2613; H04L 2027/0087; H04L 2025/03783; H04L 5/005; H04L 5/0053; H04L 27/00; H04L 27/0002; H04L 27/06; H04L 27/14; H04L 27/22; H04L 27/38; H04J 13/16; H04J 13/18; H04J 2013/165; H04W 72/04; H04W 72/044; H04W 72/0446; H04W 72/0453
See application file for complete search history.

(56) References Cited

U.S. PATENT DOCUMENTS

| | | | |
|---|---|---|---|
| 2016/0127102 A1* | 5/2016 | Kim ...................... | H04L 5/0051 370/330 |
| 2017/0272141 A1* | 9/2017 | Horiuchi ............... | H04L 5/0051 |
| 2017/0317808 A1* | 11/2017 | You ........................ | H04L 5/0051 |
| 2018/0006864 A1* | 1/2018 | Hwang .................. | H04L 5/0048 |
| 2018/0110057 A1* | 4/2018 | Park ...................... | H04B 7/0452 |
| 2018/0351720 A1* | 12/2018 | Ouchi .................. | H04L 27/2605 |
| 2019/0363851 A1* | 11/2019 | Lin ........................ | H04W 72/04 |
| 2020/0077370 A1* | 3/2020 | Qu ......................... | H04L 5/0007 |
| 2020/0204315 A1* | 6/2020 | Zhao ...................... | H04L 5/0007 |
| 2020/0389271 A1* | 12/2020 | Matsumura ........... | H04L 27/261 |
| 2022/0330077 A1* | 10/2022 | Nammi ................. | H04L 1/0028 |

OTHER PUBLICATIONS

Written Opinion for corresponding International Application No. PCT/JP2018/005598, dated Apr. 24, 2018 (5 pages).
3GPP TS 36.300 V13.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"; Jun. 2016 (310 pages).
3GPP TS 38.211 V15.0.0; "3rd Generation Partnership Project; Technical Specification Group Radio Access Network: NR; Physical channels and modulation (Release 15)"; Dec. 2017 (73 pages).
Notice of Reasons for Refusal issued in Japanese Application No. 2019-571927 dated Aug. 24, 2021 (3 pages).
Extended European Search Report issued in Application No. 18906019.7 dated Aug. 27, 2021 (10 pages).
Huawei, "Methods to support OCC in sequence hopping/group hopping configuration" 3GPP TSG RAN WG1 Meeting #61, R1-103114, Montreal, Quebec, Canada, May 10-14, 2010 (3 pages).
NTT Docomo, "Views on Uplink Enhancement for Dense Small Cell Operation" 3GPP TSG RAN WG1 Meeting #72bis, R1-131423, Chicago, USA, Apr. 15-19, 2013 (7 pages).
Huawei, "Uplink DMRS enhancement to support more orthogonal partial overlapped ports" 3GPP TSG RAN WG1 Meeting #84bis, R1-162601, Busan, Korea, Apr. 11-15, 2016 (3 pages).
NEC, "Remaining issues on DMRS" 3GPP TSG RAN WG1 Meeting AH 1801, R1-1800223, Vancouver, Canada, Jan. 22-26, 2018 (8 pages).
Office Action issued in Indonesian Application No. P00202006004; dated Jul. 27, 2022 (5 pages).
Office Action issued in Chinese Application No. 201880089275.3 dated Oct. 10, 2022 (14 pages).

* cited by examiner

RADIO TRANSMISSION DEVICE

TECHNICAL FIELD

The present invention relates to a radio transmission device.

BACKGROUND ART

Long Term Evolution (LTE) has been specified for achieving a higher data rate, lower latency, and the like in a Universal Mobile Telecommunication System (UMTS) network (see Non-Patent Literature (hereinafter referred to as "NPL") 1). Future systems of LTE have also been studied for achieving a broader bandwidth and a higher speed based on LTE. Examples of future systems of LTE include the systems called LTE-Advanced (LTE-A), Future Radio Access (FRA), 5th generation mobile communication system (5G), 5G plus (5G+), New Radio Access Technology (New-RAT)), and the like.

A demodulation reference signal for demodulating a data signal is defined in future radio communication systems (e.g., 5G), and specifications on mapping of the demodulation reference signal on resources have been formulated (see NPL 2). Note that, the demodulation reference signal may be described as "DMRS," "DM-RS," or "demodulation RS."

CITATION LIST

Non-Patent Literature

NPL 1

3GPP TS 36.300 v13.4.0, "Evolved Universal Terrestrial Radio Access (E-UTRA) and Evolved Universal Terrestrial Radio Access Network (E-UTRAN); Overall description; Stage 2 (Release 13)," June 2016

NPL 2

3GPP TS 38.211 V15.0.0, "Physical channels and modulation (Release 15)," December 2017

SUMMARY OF INVENTION

Technical Problem

However, in the present specifications of 5G, there is room for improvement in terms of a method for selecting a sequence applied for hopping of a DMRS (e.g., group hopping and/or sequence hopping).

One object of the present invention is to improve the method for selecting a sequence applied for hopping of a demodulation reference signal.

Solution to Problem

A radio transmission device according to an aspect of the present invention includes: a transmitter that transmits a radio signal in which a demodulation reference signal is mapped; and a controller that, when a plurality of the demodulation reference signals are to be mapped respectively to first and second unit resources consecutive in a time domain of the radio signal, applies a same sequence to each of the plurality of the demodulation reference signals to be mapped to the first and the second unit resources.

Advantageous Effects of Invention

It is possible to improve selection of a sequence applied for hopping of a demodulation reference signal.

DESCRIPTION OF EMBODIMENTS

Hereinafter, one embodiment of the present invention will be described with reference to the accompanying drawings.

One Embodiment

Figure 1:
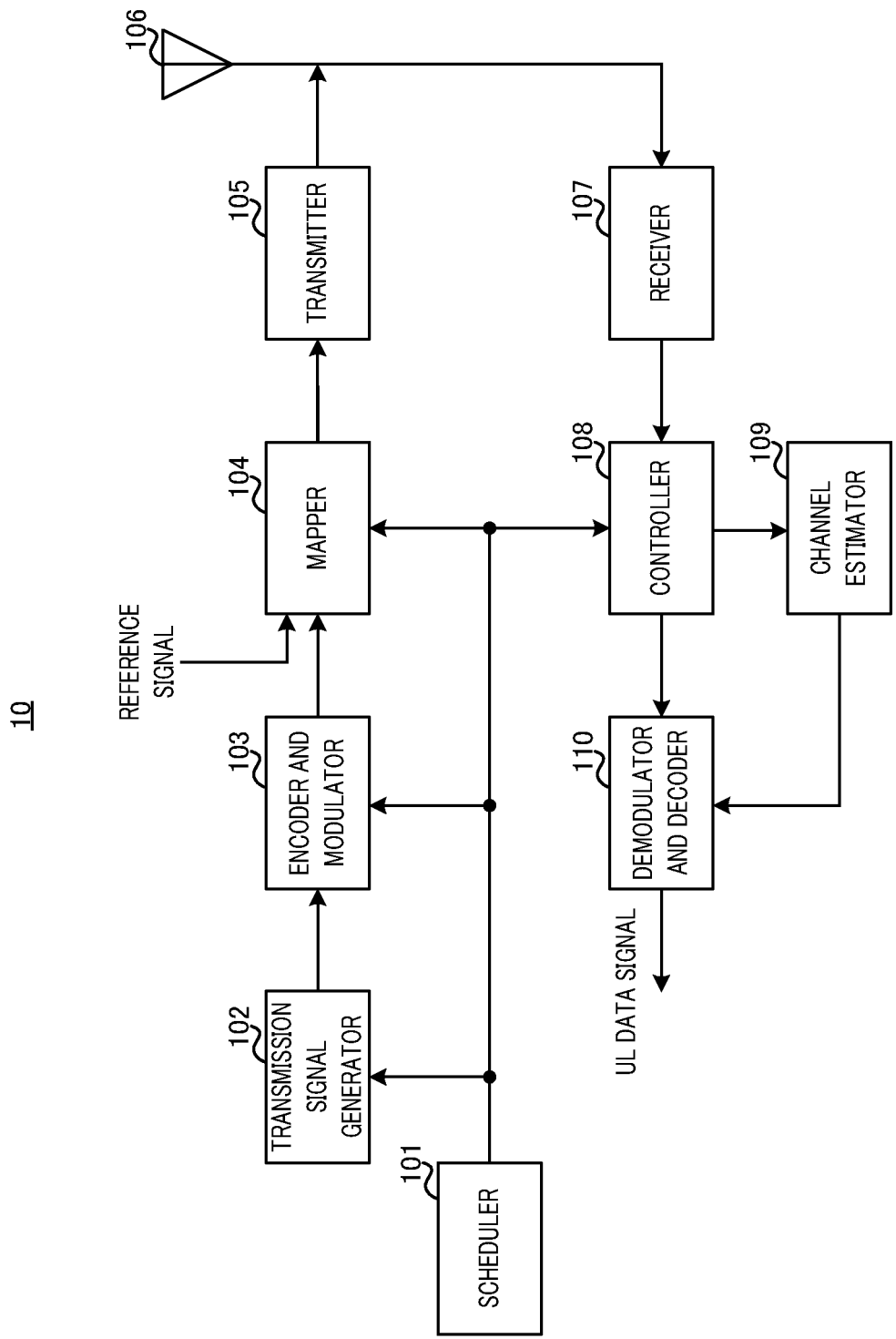
FIG. 1 is a block diagram illustrating an example of entire configuration of a radio base station according to one embodiment of the present invention.
Figure 2:
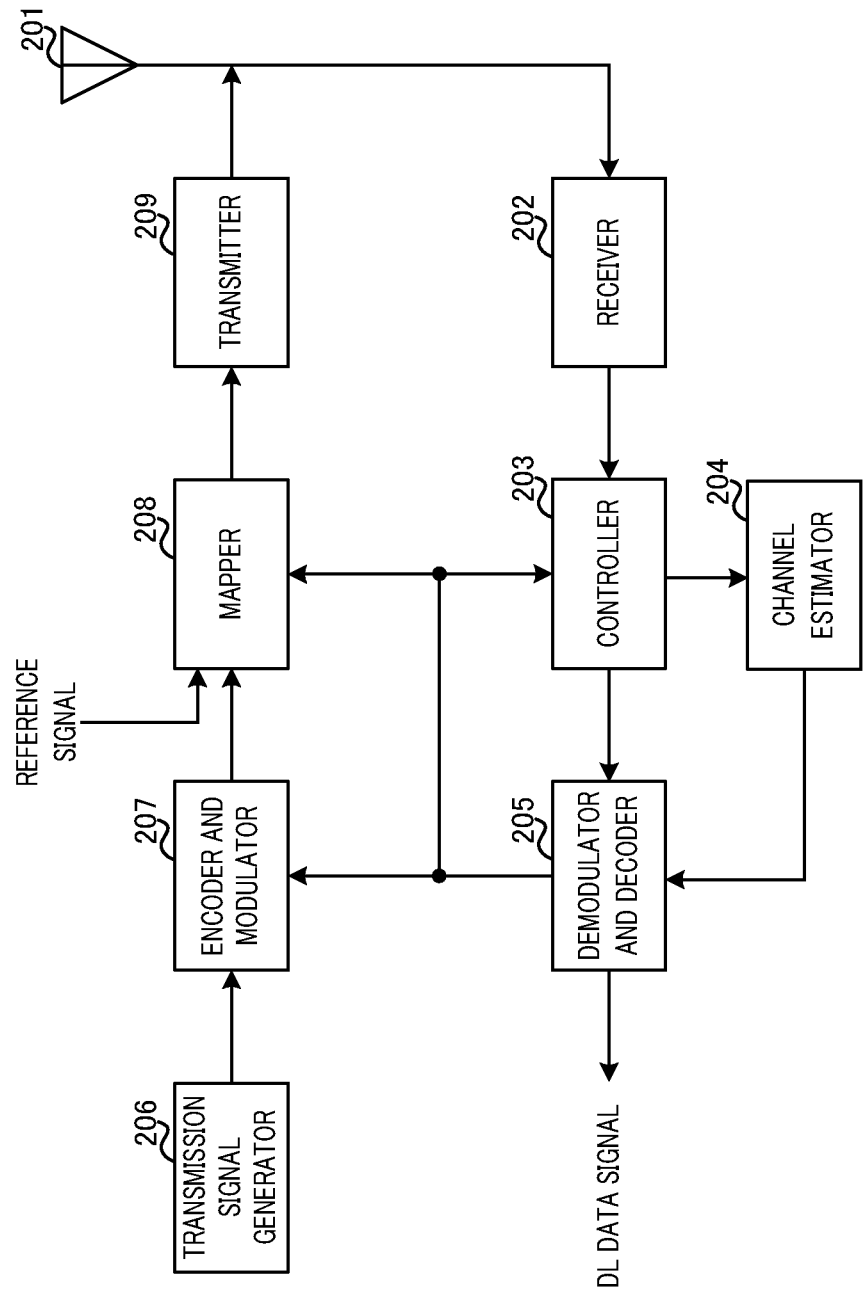
FIG. 2 is a block diagram illustrating an example of entire configuration of a user terminal according to one embodiment of the present invention.

A radio communication system according to the present embodiment includes radio base station 10 illustrated in FIG. 1 and user terminal 20 illustrated in FIG. 2. Radio base station 10 is also called eNodeB (eNB) or gNodeB (gNB), for example. User terminal 20 is also called User Equipment (UE), for example. User terminal 20 is wirelessly connected (wirelessly accesses) to radio base station 10.

Radio base station 10 transmits a downlink (DL) control signal to user terminal 20 using a downlink control channel (e.g., Physical Downlink Control Channel (PDCCH)). Radio base station 10 also transmits a DL data signal and DMRS to user terminal 20 using a DL data channel (e.g., DL shared channel (Physical Downlink Shared Channel (PDSCH))).

User terminal 20 transmits an uplink (UL) control signal to radio base station 10 using an UL control channel (e.g., Physical Uplink Control Channel (PUCCH)) or UL data channel (e.g., UL shared channel (Physical Uplink Shared Channel (PUSCH))). User terminal 20 also transmits an UL data signal and DMRS to radio base station 10 using the UL data channel (e.g., PUSCH).

The downlink channel and uplink channel through which radio base station 10 and user terminal 20 transmit or receive signals are not limited to the aforementioned PDCCH, PDSCH, PUCCH, PUSCH, and the like. Other channels, such as a Physical Broadcast Channel (PBCH), Random Access Channel (RACH), and the like may be applicable as the downlink channel and uplink channel through which radio base station 10 and user terminal 20 transmit or receive signals, for example.

In FIGS. 1 and 2, the signal waveform of a DL and/or UL signal generated at radio base station 10 or user terminal 20 may be based on Orthogonal Frequency Division Multiplexing (OFDM) modulation. Alternatively, the signal waveform of the DL and/or UL signal may be based on Single Carrier-Frequency Division Multiple Access (SC-FDMA) or DFT-Spread-OFDM (DFT-S-OFDM). Alternatively, the signal waveform of the DL and/or UL signal may be other signal waveforms.

Note that, illustration of components for generating a signal waveform (e.g., an IFFT processor, CP adder, CP remover, FFT processing part, and the like) is omitted in FIGS. 1 and 2.

Radio Base Station

FIG. 1 is a block diagram illustrating an example of entire configuration of radio base station 10 according to the present embodiment.

Radio base station 10 includes scheduler 101, transmission-signal generator 102, encoder and modulator 103, mapper 104, transmitter 105, antenna 106, receiver 107, controller 108, channel estimator 109, and demodulator and decoder 110.

Radio base station 10 may have a Multi-User Multiple-Input Multiple-Output (MU-MIMO) configuration for communicating simultaneously with a plurality of user terminals 20. Alternatively, radio base station 10 may have a Single-User Multiple-Input Multiple-Output (SU-MIMO) configuration for communicating with a single user terminal 20. Alternatively, radio base station 10 may have both of the SU-MIMO and MU-MIMO configurations.

Scheduler 101 performs scheduling (e.g., resource allocation and port assignment) of a DL signal (DL data signal, DL control signal, DMRS, or the like). In addition, scheduler 101 performs scheduling (e.g., resource allocation and port assignment) of an UL signal (UL data signal, UL control signal, DMRS, or the like). Scheduler 101 configures DMRS mapping in the DL signal and UL signal.

Information related to the aforementioned DMRS mapping may be referred to as a configuration information piece. The configuration information piece may include other information. The configuration information piece may be included, for example, in downlink control information (DCI).

Scheduler 101 outputs scheduling information including the configuration information piece to transmission signal generator 102 and mapper 104.

Scheduler 101 configures a Modulation and Coding Scheme (MCS) (such as a coding rate, modulation scheme, and the like) for the DL data signal and the UL data signal based on the channel quality between radio base station 10 and user terminal 20, for example. Scheduler 101 outputs the information on the configured MCS to transmission signal generator 102 and encoder and modulator 103. As for the MCS configuration, the present invention is not limited to the case where radio base station 10 configures the MCS, but user terminal 20 may also configure the MCS. In the case where user terminal 20 configures the MCS, radio base station 10 only have to receive the MCS information from user terminal 20 (not illustrated).

Transmission signal generator 102 generates a transmission signal (including the DL data signal and the DL control signal). For example, the DL control signal includes the DCI containing the scheduling information (e.g., configuration information piece) or the MCS information output by scheduler 101. Transmission signal generator 102 outputs the generated transmission signal to encoder and modulator 103.

Based on the MCS information input from scheduler 101, for example, encoder and modulator 103 performs encoding processing and modulation processing on the transmission signal input from transmission signal generator 102. Encoder and modulator 103 outputs the modulated transmission signal to mapper 104.

Mapper 104 maps the transmission signal input from encoder and modulator 103 on predetermined radio resources (DL resources) based on the scheduling information (e.g., DL resource allocation and configuration information piece) input from scheduler 101. Mapper 104 also maps the DMRS on the predetermined radio resources (DL resources) based on the scheduling information. Mapper 104 outputs, to transmitter 105, the DL signal mapped on the radio resources.

Transmitter 105 performs transmission processing, such as upconversion, amplification, and the like on the DL signal input from mapper 104, and transmits a radio frequency signal (DL signal) from antenna 106.

Receiver 107 performs reception processing, such as amplification, downconversion, and the like on a radio frequency signal (UL signal) received by antenna 106, and outputs the UL signal to controller 108.

Based on the scheduling information (UL resource allocation) input from scheduler 101, controller 108 separates (demaps) the UL data signal and the DMRS from the UL signal input from receiver 107. Then, controller 108 outputs the UL data signal to demodulator and decoder 110, and outputs the DMRS to channel estimator 109.

Channel estimator 109 performs channel estimation using the DMRS of the UL signal, and outputs, to demodulator and decoder 110, a channel estimation value as an estimation result.

Demodulator and decoder 110 performs, based on the channel estimation value input from channel estimator 109, demodulation and decoding processing on the UL data signal input from controller 108. Demodulator and decoder 110 transfers the demodulated UL data signal to an application section (not illustrated). The application section performs processing such as that related to a higher layer above the physical layer or the MAC layer.

A block including scheduler 101, transmission signal generator 102, encoder and modulator 103, mapper 104, and transmitter 105 may be understood as an example of a radio transmission device included in radio base station 10. Additionally, a block including receiver 107, controller 108, channel estimator 109, and demodulator and decoder 110 may be understood as an example of a radio reception device included in radio base station 10. Moreover, a block including controller 108, channel estimator 109, and demodulator and decoder 110 may be understood as an example of a processor that performs reception processing on the UL signal using the DMRS mapped in the UL signal as described later.

User Terminal

FIG. 2 is a block diagram illustrating an example of entire configuration of user terminal 20 according to the present embodiment.

User terminal 20 includes antenna 201, receiver 202, controller 203, channel estimator 204, demodulator and decoder 205, transmission signal generator 206, encoder and modulator 207, mapper 208, and transmitter 209.

Receiver 202 performs reception processing, such as amplification, downconversion, and the like on a radio frequency signal (DL signal) received by antenna 201, and outputs the DL signal to controller 203. The DL signal includes at least a DL data signal and a DMRS.

Controller 203 separates (demaps) the DL control signal and the DMRS from the DL signal input from receiver 202.

Then, controller 203 outputs the DL control signal to demodulator and decoder 205, and outputs the DMRS to channel estimator 204. Controller 203 is capable of separating the DMRS based on a DMRS configuration information piece.

Channel estimator 204 performs channel estimation using the separated DMRS, and outputs, to demodulator and decoder 205, a channel estimation value as an estimation result.

Demodulator and decoder 205 demodulates the DL control signal input from controller 203. In addition, demodulator and decoder 205 performs decoding processing (e.g., blind detection processing) on the demodulated DL control signal. Demodulator and decoder 205 outputs, to controller 203 and mapper 208, the scheduling information (e.g., DL/UL resource allocation) obtained by demodulation of the DL control signal and addressed to the corresponding user terminal, and outputs MCS information for the DL data signal to encoder and modulator 207.

Based on the MCS information for the DL data signal included in the DL control signal input from controller 203, demodulator and decoder 205 performs demodulation and decoding processing on the DL data signal input from controller 203 using the channel estimation value input from channel estimator 204. In addition, demodulator and decoder 205 transfers the demodulated DL data signal to an application section (not illustrated). The application section performs processing such as that related to a higher layer above the physical layer or the MAC layer.

Transmission signal generator 206 generates a transmission signal (including an UL data signal or UL control signal), and outputs the generated transmission signal to encoder and modulator 207.

Based on the MCS information input from demodulator and decoder 205, for example, encoder and modulator 207 performs encoding processing and modulation processing on the transmission signal input from transmission signal generator 206. Encoder and modulator 207 outputs the modulated transmission signal to mapper 208.

Mapper 208 maps the transmission signal input from encoder and modulator 207 on predetermined radio resources (UL resources) based on the scheduling information (UL resource allocation) input from demodulator and decoder 205. Mapper 208 also maps the DMRS on the predetermined radio resources (UL resources) based on the scheduling information.

The DMRS mapping on the radio resources may be controlled by controller 203, for example. For example, controller 203 configures (configuring may also be referred to as selecting or controlling) a sequence used for the DMRS according to a condition configured as describes below.

Transmitter 209 performs transmission processing, such as upconversion, amplification, and the like on the UL signal (including at least the UL data signal and DMRS) input from mapper 208, and transmits a radio frequency signal (UL signal) from antenna 201.

A block including transmission signal generator 206, encoder and modulator 207, mapper 208, and transmitter 209 may be understood as an example of a radio transmission device included in user terminal 20. Additionally, a block including receiver 202, controller 203, channel estimator 204, and demodulator and decoder 205 may be understood as an example of a radio reception device included in user terminal 20. Moreover, a block including controller 203, channel estimator 204, and demodulator and decoder 205 may be understood as an example of a processor that performs reception processing on the DL signal using the DMRS mapped in the DL signal as described later.

In the radio communication system including radio base station 10 and user terminal 20 as described above, a front-loaded DMRS is used as an example of the DMRS. The front-loaded DMRS is mapped forward in the time direction in a slot (which may also be referred to as a resource unit, a subframe, or the like) that is a unit of resource allocation. In other words, a DMRS mapped first in the time direction in the slot is called front-loaded DMRS. With the DMRS mapped forward, it is possible to reduce processing time taken for the channel estimation and demodulation processing in the radio communication system. The front-loaded DMRS may hereinafter be referred to as FL-DMRS.

Figure 3:
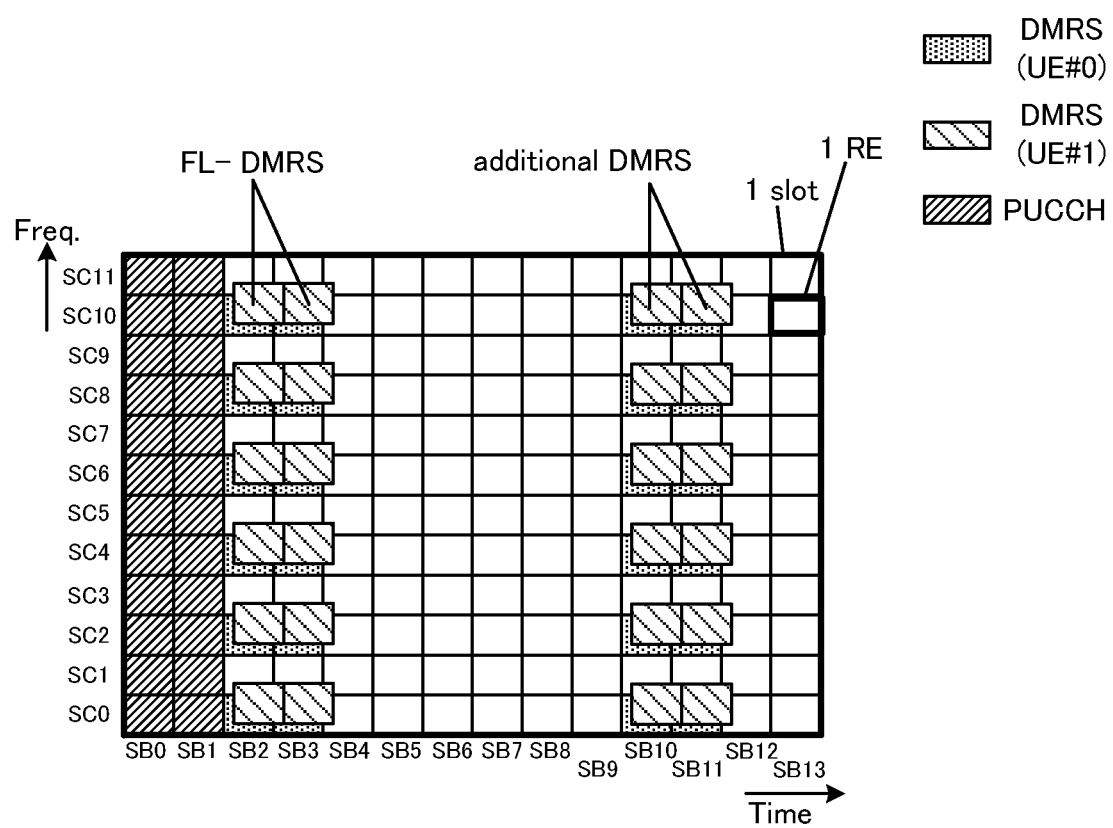
FIG. 3 illustrates an example of DMRS mapping on UL resources.

FIG. 3 illustrates an example of DMRS mapping on the UL resources. The slot illustrated in FIG. 3 has a configuration of 168 Resource Elements (REs) arranged in 14 columns in the time direction and in 12 rows in the frequency direction, for example. One RE is a radio resource region defined by one symbol and one subcarrier. One slot is configured by 14 symbols and 12 subcarriers. Note that, the "symbol" is a non-limitative example of the "unit resource" in the UL resources. Note that, the slot may also be referred to as a resource block.

14 symbols in the time direction of the RU are referred to as SB0 to SB13 sequentially from the left in the following description. 12 subcarriers in the frequency direction of the RU are referred to as SC0 to SC11 sequentially from the bottom. The definition of the slot is not limited to the above. For example, the number of symbols of the slot may be less than 14. The number of subcarriers of the slot may also be less than 11, or may also be 13 or more.

The PUCCH is mapped to the leading two symbols of SB0 and SB1 in the slot. Alternatively, the PUCCH is mapped to the leading three symbols of SB0, SB1, and SB2 in the slot. The PUCCH is mapped to the leading two symbols of SB0 and SB1 in the slot in the example of FIG. 3.

The FL-DMRS may be mapped to the third symbol (SB2) in the slot, or may be mapped to the third and the fourth consecutive symbols (SB2 and SB3) in the slot.

An additional DMRS may be mapped in the rear of the FL-DMRS in the time direction. The additional DMRS is mapped to SB10 and SB11 in the example of FIG. 3. The additional DMRS may be mapped to the same subcarriers as the FL-DMRS as illustrated in the example of FIG. 3. Hereinbelow, the additional DMRS may be referred to as A-DMRS.

Controller 203 of user terminal 20 generates the DMRS to be mapped to the UL resources, for example, based on at least one of parameters consisting of sequence group number $f_{gh}$ and sequence number v of a Zadoff-Chu sequence, a hopping mode, and Code Division Multiplexing (CDM) in the time domain. In the CDM in the time domain, an Orthogonal Cover Code (OCC) is used, for example. Hereinafter, the CDM in the time direction in which the OCC is used is referred to as Time Domain Orthogonal Cover Code (TD-OCC). Note that, a concrete example of TD-OCC is described below.

The hopping mode is information indicating whether or not sequence group hopping (which may also be referred to as group hopping) is used and whether or not sequence hopping is used. The hopping mode is configured by a higher layer (e.g., application section), for example.

When the sequence group hopping is used, sequence group number $f_{gh}$ different for each slot is selected, for example. When the sequence hopping is used, sequence number v different for each slot is selected, for example. The sequence number may be a number belonging to a certain sequence group.

Next, a description will be given of a relationship between a configuration of the hopping mode, on the one hand, and sequence group number $f_{gh}$ and sequence number v, on the other hand.

(A1) When the configuration of the hopping mode is such that neither the sequence group hopping nor the sequence hopping is used (Disable Configuration), controller 203 of user terminal 20 computes $f_{gh}$ and v by following Equation 1.

(Equation 1)

$f_{gh}=0$ $v=0$            [1]

(A2) When the configuration of the hopping mode is such that the sequence group hopping is used (Enable Configuration) and the sequence hopping is not used (Disable Configuration), controller 203 computes $f_{gh}$ and v by following Equation 2.

(Equation 2)

$f_{gh}=(\Sigma_{m=0}^{7} 2^m c(8(14n_{s,f}^\mu+l)+m)) \bmod 30$ $v=0$            [2]

Here, "$n_{s,f}^\mu$" denotes a slot number in the subframe and "l" denotes an OFDM symbol number in one slot. Additionally, "c(i)" denotes a pseudo-random sequence described in section 5.2.1 of NPL 2, and is initialized every radio frame by following Equation 3, for example.

(Equation 3)

$c_{init}=\lfloor n_{ID}^{RS}/30 \rfloor$            [3]

(A3) When the configuration of the hopping mode is such that the sequence hopping is used (Enable Configuration) and the sequence group hopping is not used (Disable Configuration), controller 203 computes $f_{gh}$ and v by following Equation 4, for example.

(Equation 4)

$f_{gh}=0$ $v=c(14n_{s,f}^\mu+1)$ for $M_{ZC} \geq 6N_{SC}^{RB}$ otherwise $v=0$      [4]

Here, "$N_{SC}^{RB}$" denotes the number of consecutive resource blocks in the subcarrier direction. "$M_{ZC}$" denotes the length of Zadoff-Chu sequence. Additionally, "c(i)" denotes the pseudo-random sequence described in section 5.2.1 of NPL 2, and is initialized every radio frame by following Equation 5, for example (Equation 5)

$c_{init}=n_{ID}^{RS}$            [5]

Regarding TD-OCC

Figure 4:
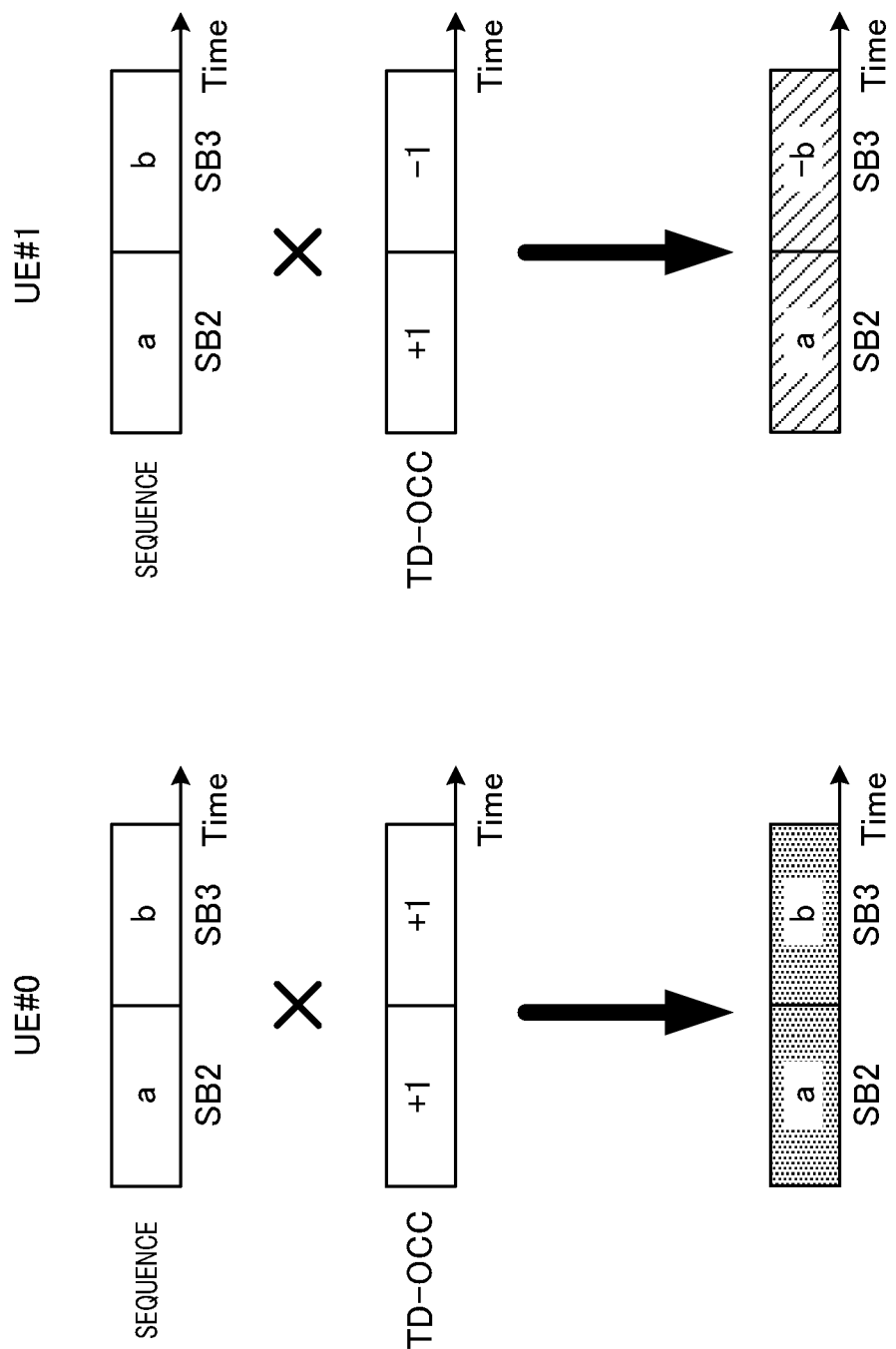
FIG. 4 is an explanatory view for explaining an example of TD-OCC to DMRS.

As illustrated in FIG. 4, in the TD-OCC, the DMRS is mapped to a plurality of consecutive symbols (e.g., two symbols) in the time domain, for example. Moreover, DMRSs for a plurality of different ports (in other words, user terminals 20) are multiplexed using the OCC. Here, since aforementioned Equations 2 and 4 include symbol number 1, the orthogonality between user terminals 20 collapses when the configuration of the hopping mode is the above (A2) or (A3), for example, and when the TD-OCC is applied to the DMRSs (e.g., two consecutive symbols) from different user terminals 20. Hereinafter, a concrete example is described with reference to FIG. 4.

UE #0 (user terminal 20) applies sequences a and b to SB2 and SB3, respectively, and applies TD-OCC {+1, +1} to the set of the sequences {a, b}. Meanwhile, UE #1 applies sequences a and b respectively to SB2 and SB3 the same as the above and applies the set of TD-OCC {+1, −1} to the sequences {a, b}.

Here, sequence a is a sequence configured using Equation 2 (or Equation 4) where symbol number 1=2, for example, and sequence b is a sequence configured using Equation 2 (or Equation 4) where symbol number 1=3, for example. In this case, in the UL signal received by the eNB (radio base station 10), reception signal $r_0$ corresponding to the DMRSs of UEs #0 and #1 multiplexed in SB2 and reception signal $r_1$ corresponding to the DMRSs of UEs #0 and #1 multiplexed in SB3 are expressed by following Equation 6, for example.

[6]

$$\begin{bmatrix} r_0 \\ r_1 \end{bmatrix} = \begin{bmatrix} 1 & 0 \\ 0 & 1 \end{bmatrix} \begin{bmatrix} a \\ b \end{bmatrix} h_0 + \begin{bmatrix} 1 & 0 \\ 0 & -1 \end{bmatrix} \begin{bmatrix} a \\ b \end{bmatrix} h_1 \quad \text{(Equation 6)}$$

Here, "$h_0$" denotes propagation characteristics (channel gain) between UE #0 and the eNB, for example, and "$h_1$" denotes propagation characteristics (channel gain) between UE #1 and the eNB, for example.

In order to extract the DMRS in the UL signal transmitted from UE #0 so as to estimate $h_0$, the eNB performs despreading on reception signals {$r_0$, $r_1$} using TD-OCC {+1, +1} applied by UE #0. Despreading processing can be expressed by following Equation 7, for example.

[7]

$$[1 \quad 1] \begin{bmatrix} r_1 \\ r_2 \end{bmatrix} = (a+b)h_0 + (a-b)h_1 \quad \text{(Equation 7)}$$

Here, since the orthogonality collapses when it is not true that "a=b" in Equation 7, the component of $(a-b)h_1$ remains. For this reason, the estimation accuracy for $h_0$ estimated using despreading by the eNB may decrease.

In the present embodiment, any one of the following controls or processes of (B1) to (B4) is performed in the case of the hopping mode of above (A2) or (A3).

EXAMPLE 1

B1

In a case where the DMRS is mapped to consecutive symbols, controller 203 of user terminal 20 performs a control different from the control (selection of sequence) described at the above (A2) or (A3). The case where the DMRS is mapped to consecutive symbols means a case where the maximum number of symbols for DMRS is configured to "2" by the higher layer and the actual number of symbols for DMRS is configured to "2" by the DCI, for example. Hereinbelow, a description will be given of the case where the DMRS is mapped to two consecutive symbols. However, the present embodiment is also applicable to a case where the DMRS is mapped to three or more consecutive symbols.

In the case where the DMRS is mapped to two consecutive symbols and the configuration of the hopping mode is the above (A2), controller 203 uses, for $f_{gh}$ of the second one (e.g., SB3 in FIG. 3) of the two consecutive symbols, $f_{gh}$ computed for the first symbol (e.g., SB2 in FIG. 3).

Additionally, in the case where the DMRS is composed of two consecutive symbols and the configuration of the hopping mode is the above (A3) (the sequence group hopping is disabled and the sequence hopping is enabled), controller 203 uses, for v of the second one of the two consecutive symbols, v computed for the first symbol.

B2

In the case where the DMRS is mapped to two consecutive symbols and the configuration of the hopping mode is the above (A2) (the sequence group hopping is enabled and the sequence hopping is disabled), controller 203 uses, for $f_{gh}$ of the first one of the two consecutive symbols, $f_{gh}$ computed for the second symbol.

Additionally, in the case where the DMRS is mapped to two consecutive symbols and the configuration of the hopping mode is the above (A3) (the sequence group hopping is disabled and the sequence hopping is enabled), controller 203 uses, for v of the first one of the two consecutive symbols, v computed for the second symbol.

B3

In the case where: the TD-OCC is configured to be "enabled" by the higher layer; the DMRS is mapped to two consecutive symbols; and the configuration of the hopping mode is the above (A2) (the sequence group hopping is enabled and the sequence hopping is disabled), controller 203 uses, for $f_{gh}$ of the second one of the two consecutive symbols, $f_{gh}$ computed for the first symbol.

Additionally, in the case where: the TD-OCC is configured to be "enabled" by the higher layer; the DMRS is mapped to two consecutive symbols; and the configuration of the hopping mode is the above (A3) (the sequence group hopping is disabled and the sequence hopping is enabled), controller 203 uses, for v of the second one of the two consecutive symbols, v computed for the first symbol.

B4

In the case where: the TD-OCC is configured to be "enabled" by the higher layer; the DMRS is mapped to two consecutive symbols; and the configuration of the hopping mode is the above (A2) (the sequence group hopping is enabled and the sequence hopping is disabled), controller 203 uses, for $f_{gh}$ of the first one of the two symbols, $f_{gh}$ computed for the second symbol.

Additionally, in the case where: the TD-OCC is configured to be "enabled" by the higher layer; the DMRS is mapped to two consecutive symbols; and the configuration of the hopping mode is the above (A3) (the sequence group hopping is disabled and the sequence hopping is enabled), controller 203 uses, for v of the first one of the two symbols, v computed for the second symbol.

Note that, when a configuration by the higher layer does not correspond to any of the above (B1), (B2), (B3), and (B4), controller 203 may perform the control (selection of sequence) described at the above (A2) or (A3).

EXAMPLE 2

A description will be given of Example 2 where equations different from those used in Example 1 are used.

In the case where the configuration of the hopping mode is the above (A2), that is, in the case where the sequence group hopping is enabled and the sequence hopping is disabled, controller 203 of user terminal 20 computes $f_{gh}$ and v by following Equation 8 or Equation 9, for example. Equation 8 corresponds to Equation 2 from which the variable "1" is deleted, and Equation 9 corresponds to Equation 2 from which the variable "1" and numerical value "14" are deleted. In Equation 9, the sequence group hopping used for the PUCCH is reused for the DMRS.

(Equation 8)

$$f_{gh} = (\Sigma_{m=0}^{7} 2^m c(8(14 n_{s,f}^\mu) + m)) \bmod 30$$

$$v = 0 \qquad [8]$$

(Equation 9)

$$f_{gh} = (\Sigma_{m=0}^{7} 2^m c(8(n_{s,f}^\mu) + m)) \bmod 30$$

$$v = 0 \qquad [9]$$

Note that, the aforementioned Equations 8 and 9 are examples, and controller 203 may use an equation different from the above equations as long as $f_{gh}$ of the first symbol and $f_{gh}$ of the second symbol are equal to each other.

Note also that, in the case where the DMRS is mapped to consecutive symbols and the configuration of the hopping mode is the above (A2), controller 203 may also compute $f_{gh}$ and v by Equation 8 or 9.

Note also that, in the case where: the TD-OCC is configured to be "enabled" by the higher layer; the DMRS is mapped to consecutive symbols; and the configuration of the hopping mode is the above (A2), controller 203 may also compute $f_{gh}$ and v by Equation 8 or 9.

In the case where the configuration of the hopping mode is the above (A3), that is, in the case where the sequence hopping is enabled and the sequence group hopping is disabled, controller 203 computes $f_{gh}$ and v by following Equation 10 or Equation 11. Equation 10 corresponds to Equation 4 from which the variable 1 is deleted, and Equation 11 corresponds to Equation 4 from which the variable 1 and numerical value "14" are deleted.

(Equation 10)

$$f_{gh} = 0$$

$$v = c(14 n_{s,f}^\mu) \text{ for } M_{ZC} \geq 6 N_{SC}^{RB} \text{ otherwise } v = 0 \qquad [10]$$

(Equation 11)

$$f_{gh} = 0$$

$$v = c(n_{s,f}^\mu) \text{ for } M_{ZC} \geq 6 N_{SC}^{RB} \text{ otherwise } v = 0 \qquad [11]$$

Note that, the aforementioned Equations 10 and 11 are examples, and controller 203 may use an equation different from the above equations as long as v of the first symbol and v of the second symbol are equal to each other. In Equation 10, the sequence hopping used for the PUCCH is reused for the DMRS.

Note also that, in the case where the DMRS is mapped to consecutive symbols and the configuration of the hopping mode is the above (A3) (the sequence hopping is enabled and the sequence group hopping is disabled), controller 203 may also compute $f_{gh}$ and v by above Equation 10 or 11.

Note also that, in the case where: the TD-OCC is configured to be "enabled" by the higher layer; the DMRS is mapped to consecutive symbols; and the configuration of the hopping mode is the above (A3) (the sequence hopping is enabled and the sequence group hopping is disabled), controller 203 may also compute $f_{gh}$ and v by above Equation 10 or 11.

Note that, the aforementioned Equations 8, 9, 10, and 11 are examples, and controller 203 may use an equation different from the above equations as long as $f_{gh}$ of the first symbol and $f_{gh}$ of the second symbol are equal to each other. Similarly, controller 203 may use an equation different from the above equations as long as v of the first symbol and v of the second symbol are equal to each other.

EXAMPLE 3

A description will be given of Example 3 where a condition is provided under which application of Equations 2 and 4 is accepted with respect to the DMRS mapped to two consecutive symbols.

For example, controller 203 of user terminal 20 may carry out the control of the above (A2) or (A3) according to the configuration of the hopping mode when the following condition (C1) or (C2) is satisfied. In other words, when neither of the following conditions (C1) and (C2) is not satisfied, the control of the above (A2) or (A3) according to the configuration of the hopping mode does not have to be performed. To put it in still other words, the control of the above (A2) or (A3) may be performed only when the following condition (C1) or (C2) is satisfied.

C1

When a condition that the maximum number of symbols for DMRS is configured to "one" by the higher layer or a condition that the maximum number of symbols for DMRS is configured to "two" by the higher layer and the actual number of symbols for DMRS is configured to "one" by the DCI is satisfied, the control of the above (A2) or (A3) may be carried out according to the configuration of the hopping mode.

Note that, when the conditions of the above (C1) are not satisfied, that is, when a configuration different from the above configurations is made by the higher layer, controller 203 may perform the control of the above (A1), that is, controller 203 applies neither the sequence group hopping nor the sequence hopping.

Alternatively, when the conditions of the above (C1) are not satisfied, that is, when a configuration different from the above configurations is made by the higher layer, controller 203 may perform one of the controls illustrated at the above (B1) to (B4), or the control illustrated in Example 2.

C2

When a condition that the TD-OCC is configured to be "disabled" by the higher layer is satisfied, the control of the above (A2) or (A3) may be performed according to the configuration of the hopping mode.

Note that, when the condition of the (C2) is not satisfied, that is, when a configuration different from this configuration is made by the higher layer, controller 203 may perform the control of the above (A1), that is, controller 203 applies neither the sequence group hopping nor the sequence hopping.

Alternatively, when a configuration different from this configuration is made by the higher layer, controller 203 may perform one of the controls (selection of sequence) illustrated at the above (B1) to (B4), or the control (selection of sequence) illustrated in Example 2.

EXAMPLE 4

The above embodiments have been described in relation to the case where either the sequence group hopping or the sequence hopping is "effective (enabled)." However, the embodiments described above are also applicable to a case where both of the sequence group hopping and the sequence hopping are configured to be "enabled."

For example, the embodiments may also be applied to a case where the DMRS is mapped to two consecutive symbols and both of the sequence group hopping and the sequence hopping are configured to be "enabled." In this case, controller 203 of user terminal 20 may apply, as $f_{gh}$ and v of one of the two consecutive symbols, $f_{gh}$ and v applied to the other one of the two consecutive symbols, respectively, for example.

One Example of Effect of Embodiment

In the embodiments, when the DMRS is mapped to a plurality of consecutive symbols, user terminal 20 applies the same sequence (sequence identified by $f_{gh}$ and/or v) to the plurality of symbols. With this configuration, when DMRSs to which the TD-OCC is applied are multiplexed in an UL signal, for example, the orthogonality of the multiplexed DMRSs is preserved.

Accordingly, radio base station 10 can separate a DMRS of desired user terminal 20 from the UL signal in which the DMRSs of user terminals 20 are multiplexed, so as to prevent a decrease in accuracy in estimating a channel estimation value. Moreover, since the calculation amount of despreading calculations indicated in Equation 7 is smaller than the calculation amount of calculations in which an inverse matrix is used, the processing load, circuit scale, and/or consumed electric power in radio base station 10 may be reduced.

The embodiments of the invention have been described above.

Hardware Configuration

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 5:
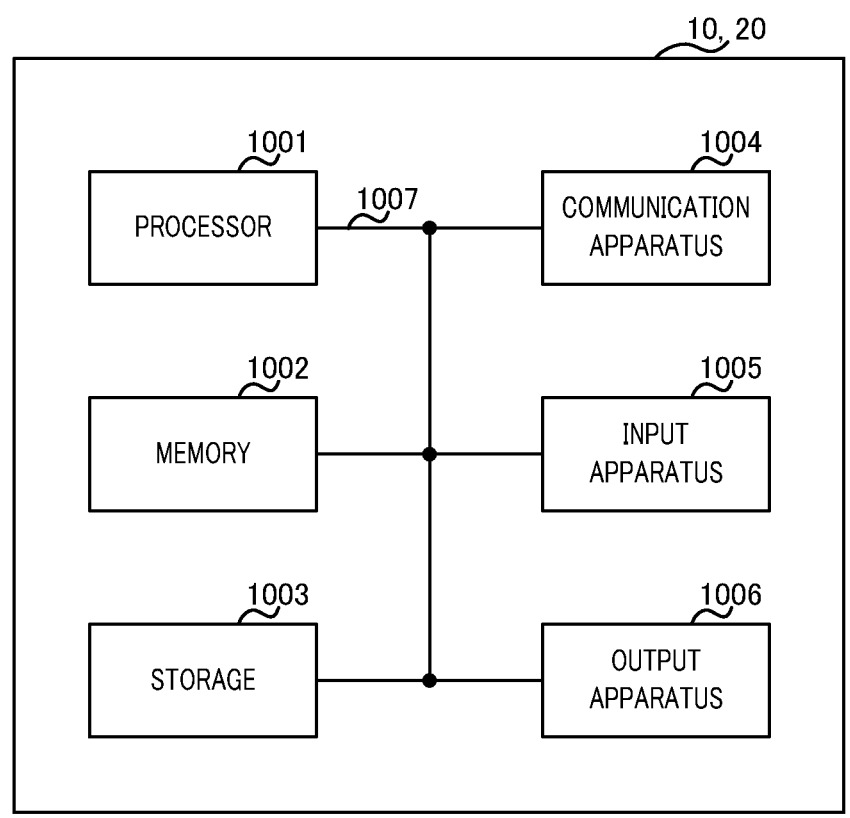
FIG. 5 illustrates an example of hardware configuration of the radio base station and the user terminal according to one embodiment of the present invention.

For example, radio base station 10, user terminal 20, and the like according to an embodiment of the present invention may function as a computer that executes processing of a radio communication method of the present invention. FIG. 5 illustrates an example of a hardware configuration of radio base station 10 and user terminal 20 according to an embodiment of the present invention. Radio base station 10 and user terminal 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of radio base station 10 and of user terminal 20 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in radio base station 10 and user terminal 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, scheduler 101, transmission signal generators 102 and 206, encoder and modulators 103 and 207, mappers 104 and 208, controllers 108 and 203, channel estimators 109 and 204, demodulator and decoders 110 and 205, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, scheduler 101 of radio base station 10 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmitter 105 and 209, antennas 106 and 201, receiver 107 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, radio base station 10 and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

Notification and Signaling of Information

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

Adaptive System

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

Processing Procedure and the Like

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

Operation of Base Station

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

Direction of Input and Output

The information, the signals, and the like can be output from a higher layer (or a lower layer) to a lower layer (or a higher layer). The information, the signals, and the like may be input and output through a plurality of network nodes.

Handling of Input and Output Information and the Like

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

Determination Method

The determination may be made based on a value expressed by one bit (0 or 1), based on a Boolean value (true or false), or based on comparison with a numerical value (for example, comparison with a predetermined value).

Software

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

Information and Signals

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

"System" and "Network"

The terms "system" and "network" used in the present specification can be interchangeably used.

Names of Parameters and Channels

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

Base Station

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "gNB," "cell," and "sector" may be interchangeably used in the present specification. The base station may be called a fixed station, a NodeB, an eNodeB (eNB), a gNodeB (gNB), an access point, a femto cell, a small cell, or the like.

Terminal

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard. In addition, the DMRS may be call by other corresponding names, e.g., demodulation RS, DM-RS, and the like.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The radio frame may be constituted by one frame or a plurality of frames in the time domain. The one frame or each of the plurality of frames may be called a subframe, a time unit, or the like in the time domain. The subframe may be further constituted by one slot or a plurality of slots in the time domain. The slot may be further constituted by one symbol or a plurality of symbols (OFDM (Orthogonal Frequency Division Multiplexing) symbol, SC-FDMA (Single Carrier-Frequency Division Multiple Access) symbol, or the like) in the time domain.

The radio frame, the subframe, the slot, the mini slot, and the symbol indicate time units in transmitting signals. The radio frame, the subframe, the slot, the mini slot, and the symbol may be called by other corresponding names.

For example, in the LTE system, the base station creates a schedule for assigning radio resources to each mobile station (such as frequency bandwidth that can be used by each mobile station and transmission power). The minimum time unit of scheduling may be called a TTI (Transmission Time Interval).

For example, one subframe, a plurality of continuous subframes, one slot may be called a TTI, or one mini slot may be called a TTI.

The resource unit is a resource assignment unit in the time domain and the frequency domain, and the resource unit may include one subcarrier or a plurality of continuous subcarriers in the frequency domain. In addition, the resource unit may include one symbol or a plurality of symbols in the time domain, and may have a length of one slot, one mini slot, one subframe, or one TTI. One TTI and one subframe may be constituted by one resource unit or a plurality of resource units. The resource unit may be called a resource block (RB), a physical resource block (PRB: Physical RB), a PRB pair, an RB pair, a scheduling unit, a frequency unit, or a subband. The resource unit may be constituted by one RE or a plurality of REs. For example, one RE only has to be a resource smaller in unit size than the resource unit serving as a resource assignment unit (for example, one RE only has to be a minimum unit of resource), and the naming is not limited to RE.

The structure of the radio frame is illustrative only, and the number of subframes included in the radio frame, the number of slots included in the subframe, the number of mini slots included in the subframe, the numbers of symbols and resource blocks included in the slot, and the number of subcarriers included in the resource block can be changed in various ways.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

REFERENCE SIGNS LIST

10 Radio base station
20 User terminal
101 Scheduler 102, 206 Transmission signal generator
103, 207 Encoder and modulator
104, 208 Mapper
105, 209 Transmitter
106, 201 Antenna
107, 202 Receiver
108, 203 Controller
109, 204 Channel estimator
110, 205 Demodulator and decoder

The invention claimed is:

1. A terminal, comprising:
a transmitter that performs transmission processing of an uplink shared channel; and
a processor that, when transmitting a demodulation reference signal on a single carrier using a first symbol and a second symbol which are consecutive in a time domain in the uplink shared channel, applies a sequence used for the demodulation reference signal in the first symbol to the demodulation reference signal in the second symbol,
wherein the sequence depends on a sequence group number, a symbol number of a symbol to which the demodulation reference signal is mapped, and a slot number of a slot to which the demodulation reference signal is mapped.

2. A radio communication method, comprising:
performing transmission processing of an uplink shared channel; and
when transmitting a demodulation reference signal on a single carrier using a first symbol and a second symbol which are consecutive in a time domain in the uplink shared channel, applying a sequence used for the demodulation reference signal in the first symbol to the demodulation reference signal in the second symbol,
wherein the sequence depends on a sequence group number, a symbol number of a symbol to which the demodulation reference signal is mapped, and a slot number of a slot to which the demodulation reference signal is mapped.

* * * * *